2,945,018
OLEFIN POLYMERIZATION

Rudolph F. Fischer, Oakland, Calif., assignor to Shell Oil Company, a corporation of Delaware No Drawing. Filed Jan. 21, 1958, Ser. No. 710,177

13 Claims. (Cl. 260—94.9)

This invention relates to processes for polymerizing olefins. More particularly it relates to the polymerization of mono alpha-olefins using novel polymerization catalysts.

The prior art describes many processes for polymerizing ethylene and other mono alpha-olefins using a variety of catalysts and processing conditions. The present invention affords novel processes for the polymerization of mono alpha-olefin using novel catalyst compositions, which compositions and processes afford advantages in polymerization rates, yields, simplified operating procedures, and the like.

It is an object of this invention to provide novel processes for the polymerization of mono alpha-olefins. It is another object of this invention to provide novel catalyst compositions for the polymerization of mono alpha-olefins. It is yet another object of this invention to provide processes for the polymerization of mono alpha-olefins, particularly lower mono alpha-olefins, which processes are conducted at moderate temperatures and pressures. Other objects will become apparent as the description of the invention proceeds.

These and other objects are accomplished by the process of polymerizing a mono alpha-olefin which comprises conducting the polymerization at temperatures ranging from about 100° C. to about 200° C. at elevated pressures in the presence of aluminum and aluminum alkyl sesquihalide, the mole ratio thereof being from about 1:1 to about 5:1. Under these conditions the polymerization of mono alpha-olefins proceeds at a suitable rate and affords improved yields.

The present processes are particularly suited for the polymerization of lower mono alpha-olefins such as ethylene, propylene, butene-1, mixtures thereof, and the like, as such olefins are found to polymerize more readily using the novel processes of this invention. Higher mono alpha-olefins, having as many as 10 carbon atoms, may be polymerized by the present processes but as the number of carbon atoms in the olefin increases, the rate of polymerization decreases so that with mono alpha-olefins having from 6 to 10 carbon atoms somewhat longer reaction times are required.

As previously indicated, the polymerization takes place in the presence of added aluminum and aluminum alkyl sesquihalide. While this invention is not limited by any theoretical considerations it is believed that the actual polymerization is catalyzed by a reaction product of the aluminum, aluminum alkyl sesquihalide and an indeterminate amount of the mono alpha-olefin which is to be polymerized. Experimental evidence tends to indicate that such is the case but it cannot be said for certain whether the catalyst is thereby formed from three components. The experimental evidence for these theoretical considerations is the observation that an induction period is inevitably required before actual polymerization begins. Because an induction period is required while the three components are together it may be stated that the actual polymerization catalyst is always formed in situ. This is found to be the case irrespective of any pretreatment or premixing of the aluminum or the aluminum alkyl sesquihalide.

These last two components may be charged to the reactor in any suitable manner. Thus, they may be merely charged to the reactor or if desired the sesquihalide may be contained in hydrocarbon solution and the solution thus prepared merely mix with the aluminum. Alternatively, the aluminum and the aluminum alkyl sesquihalide may be reacted at elevated temperatures which should not exceed the temperature at which the sesquihalide boils. In actual practice, pretreatment of these two components at elevated temperatures is not necessary since no advantage is obtained thereby as the catalyst is formed in situ as indicated above. In the preferred embodiment the two components are merely charged to the reactor in measured amounts although it is more preferred that the aluminum alkylsesquihalide be contained in hydrocarbon dilution.

The quantity of the aluminum and aluminum alkylsesquihalide should be controlled within a fairly narrow range. The aluminum:aluminum alkylsesquihalide molar ratio is from about 1:1 to about 5:1. If the molar portion of the aluminum alkylsesquihalide exceeds the aluminum there is obtained a sticky, viscous polymer which is extremely difficult to handle. The same situation exists when the molar concentration of the aluminum exceeds the molar concentration of the sesquihalide beyond about 5:1. In the preferred embodiment the ratio is about 1:1 to about 2:1 with the former being most preferred.

Any aluminum alkyl sesquihalide may be employed but it is more advantageous to select the sesquihalide so that the alkyl radicals have the same number of carbon atoms as the olefin to be polymerized. Some advantage will be afforded by such a selection although the present processes are not limited thereto and if desired the alkyl radicals of the sesquihalide may have a greater or lesser number of carbon atoms in relation to the olefin to be polymerized. In any case the alkyl radicals of the sesquihalide should not exceed about 10 carbon atoms. The halide of the aluminum alkyl sesquihalide most advantageously is selected from the chlorides or bromides with the iodides and fluorides being less preferred. Actually, the aluminum alkyl sesquihalide is selected based largely on its cost and accordingly aluminum ethyl sesquichloride is presently preferred. Other sesquihalides which may be employed include, for example, aluminum methyl sesquibromide, aluminum ethyl sesquibromide, aluminum propyl sesquiiodide, aluminum methyl sesquichloride and the like. The sesquihalides are actually mixtures consisting of about equimolar parts of aluminum monoalkyl halide and aluminum dialkyl halide. The sesquihalides used in the present invention may be prepared by any means and if desired it may be prepared by mixing the aluminum monoalkyl dihalide and aluminum dialkyl halide. The aluminum, which is the other component of the catalyst system, may be employed in any form such as pellets, turnings, fillings, and the like. It will be found that the catalyst forms more quickly when the aluminum is of higher purity and is substantially free of aluminum oxide.

The quantity of the aluminum and aluminum alkylsesquihalids in the polymerization affects only the rate of polymerization rather than the conversions because it will be found that these components are not consumed during the course of the polymerization. Accordingly, the quantity of these components to be used may be conveniently computed on the capacity of the reactor and ranges from about 1 to 10 grams per liter of reactor volume with about 3 to 7 grams being more preferred.

The processes of this invention are conducted at elevated temperatures and pressures. The pressure may be varied over a wide range from as little as 50 p.s.i.g. to as high as 1000 to 2000 p.s.i.g., and even higher. In the preferred procedures, the pressures range from about 200 p.s.i.g. to about 1000 p.s.i.g. as such a range affords a suitable polymerization rate. At higher pressures, even faster rates are achieved but the advantage in rate is largely offset by increased operating costs.

The temperatures at which the reaction is conducted may range from about 100° C. to 200° C. At the lower temperatures within this range it will be found that a longer induction period will be required before polymerization begins so that it is advantageous to heat the contents of the reactor, including the mono alpha-olefin, to about 140–160° C. thereby eliminating a long induction period. Once the polymerization begins, as indicated by a pressure drop, the polymerization temperature may be lowered. In the preferred embodiment the polymerization is conducted, after the induction period, at temperatures ranging from about 110° C. to about 180° C.

After the polymerization is complete the contents of the reactor are recovered and the reaction product is treated to separate the unreacted olefin and solvent, if used. The polymer is treated to remove the catalyst residues which treatment comprises a washing with a lower alcohol, as methanol, which is acidified with a small amount of a mineral acid. Thereafter the polymer is washed with water and treated with a dilute solution of a base, such as sodium carbonate, to neutralize the residual acid. The polymer thus obtained will range from a wax to a solid polymer depending on the operational conditions employed and the nature of the monomer to be polymerized.

It is another advantage of the present invention that any mono alpha-olefin may be polymerized by the present processes. In the more preferred embodiment the olefin has up to six carbon atoms with ethylene and propylene being particularly preferred. With higher mono alpha-olefins as decene-1, octadecene-1, and the like, the polymerization rates are longer.

The processes of this invention may be conducted in either batch or continuous types of operations with the latter being preferred because it affords higher production per unit of time. In such operations the mono alpha-olefin is charged to a reaction chamber containing the aluminum and the aluminum alkyl sesquihalide. These may be fed into the reactor as a mixture of the sesquihalide containing the aluminum in suspension. It is more preferred, however, that these be mixed with a hydrocarbon diluent and the dilution thus prepared be charged to the reactor in a continuous or intermittent manner. In continuous operations the feed rate of the mono alpha-olefin and the two components are at a predetermined rate which is about equal to the off-take which in turn depends on the residence time within the reactor. For batch operations the reactor is charged with the aluminum and the sesquihalide and then the reactor is pressured with the mono alpha-olefin. After the reaction is complete the reaction product is recovered and treated to separate the polymer and unreacted mono alpha-olefin, which is subsequently recycled to the reactor.

The processes of this invention do not require the use of an inert diluent but greater contact between the catalyst and the olefin is afforded if a diluent is used. If a diluent is to be used any inert hydrocarbon solvent may be employed, such as hexane, isooctane, pentane, benzene, toluene, cyclohexane and the like.

The processes of this invention should be conducted in the absence of impurities which affect the catalyst. Such impurities are in the form of oxygen, oxygen-containing compounds, water and the like. Accordingly, it is desirable to treat the various components in order to separate such impurities if they are present. For example, the processes of this invention are particularly suited for the polymerization of ethylene. Ethylene that is available through normal commercial channels may contain substantial amounts of ethane and water. The ethane does not adversely affect the polymerization but the water is particularly harmful and the ethylene feed should then be treated to separate or reduce the amount prior to being used in the present processes.

Various processing techniques may be employed to improve reaction rates or to obtain some other processing advantage. One such technique is the use of inert carriers to support the aluminum and the sesquihalides. Such carriers are represented by various earths, as diatomaceous earth, inorganic salts and the like. When such carriers are used they should be treated to remove any hydroscopic moisture. Such a treatment may be a calcining at temperatures ranging from about 200 and 800° C. Other processing techniques that may be used with advantage includes the use of efficient agitation during the polymerization as well as intermittent addition of aluminum and sesquihalide during the course of the polymerization.

The invention is described in greater detail in the following examples.

*Example I*

To a 320 ml. nitrogen-flushed stainless steel vessel is charged a mixture of 10.2 grams of aluminum ethyl sesquichloride and 5 grams of powdered aluminum. The vessel is pressured to 740 p.s.i.g. with ethylene and heated with agitation. After the temperature reaches about 142° C. the pressure begins to drop indicating that the reaction begins. The temperature of the reactor is then permitted to drop to about 120° C. It is observed that the ethylene adsorption rate is fairly rapid. From time to time the reactor is pressured to about 575 p.s.i.g. This cycle is continued until the ethylene adsorption rate is substantially constant whereupon the contents of the reactor are discharged. On washing the polymer with methanol containing hydrochloric acid there is recovered 231 grams of a wax having a melting point range of 45–60° C.

*Example II*

The procedure of Example I is repeated using 5 grams of aluminum ethyl sesquichloride and 5 grams aluminum powder. Substantially quantitative yields are obtained and, in this case, the polymer is a solid.

*Example III*

The procedure of Example I is repeated using aluminum methyl sesquibromide and aluminum powder. In this example the yields are substantially quantitative although the conversion is slightly lower.

*Example IV*

The procedure of Example I is repeated using propylene. The polymer recovered, which is a solid, is identified as polypropylene.

*Example V*

The procedure of Example IV is repeated using an equivalent amount of aluminum propyl sesquichloride. In this case slightly higher yields are obtained than in Example IV.

*Example VI*

The procedure of Example I is repeated except that the mono alpha-olefin is a mixture of ethylene and propylene. The resultant product is a solid copolymer of ethylene and propylene.

A series of experiments are conducted varying the molar ratios of the aluminum ethyl sesquichloride and aluminum powder. It is found that the most desirable results are obtained when equimolar amounts of the aluminum and aluminum alkyl sesquihalide are used but in all cases there is obtained suitable yields of polymer. It is also found that there is no substantial difference between the ethyl sssquibromide and chloride.

From the foregoing it will be observed that the present invention is capable of numerous modifications not only in regard to the specific catalyst compositions but also in regard to the conditions of the reaction. Such modifications, and others, may be undertaken without departing from the spirit of this invention. Thus persons skilled in the art will readily appreciate that the polymers of this invention may be blended with stabilizers, dyes and pigments and the like and employed for the production of molded products. The waxy polymers which may be obtained, as indicated in Example I, are particularly useful for blending with polyethylene having a high intrinsic viscosity thereby permitting the production of a polymer which has improved flow properties.

I claim as my invention:

1. The process which comprises polymerizing a mono alphaolefin at temperatures ranging from about 100° C. to about 200° C. at elevated pressures up to 1000 p.s.i.g. and in the presence of a composition consisting essentially of the reaction product of aluminum and aluminum alkyl sesquihalide, the mole ratio thereof being from about 1:1 to about 5:1.

2. The process of claim 1 in which the aluminum alkyl sesquihalide has from 1 to 10 carbon atoms.

3. The process of claim 1 in which the aluminum alkyl sesquihalide is aluminum ethyl sesquichloride.

4. The process of claim 1 in which the aluminum alkyl sesquihalide is aluminum ethyl sesquibromide.

5. The process of claim 1 in which the aluminum alkyl sesquihalide is aluminum methyl sesquibromide.

6. The process of claim 1 in which the aluminum alkyl sesquihalide is aluminum methyl sesquichloride.

7. The process of claim 1 in which the aluminum alkyl sesquihalide is aluminum propyl sesquichloride.

8. The process which comprises polymerizing ethylene at temperatures ranging from about 100° C. to about 200° C. at elevated pressures up to 1000 p.s.i.g. and in the presence of a composition consisting essentially of the reaction product of aluminum and aluminum alkyl sesquihalide, the mole ratio thereof being from about 1:1 to about 5:1.

9. The process of claim 8 in which the aluminum alkyl sesquihalide has from 1 to 10 carbon atoms.

10. The process of claim 8 in which the aluminum alkyl sesquihalide is aluminum ethyl sesquichloride.

11. The process of claim 8 in which the aluminum alkyl sesquihalide is aluminum ethyl sesquibromide.

12. The process of claim 8 in which the aluminum alkyl sesquihalide is aluminum methyl sesquibromide.

13. The process of claim 8 in which the aluminum alkyl sesquihalide is aluminum methyl sesquichloride.

References Cited in the file of this patent

UNITED STATES PATENTS

| | | |
|---|---|---|
| 2,220,930 | Kraus | Nov. 12, 1940 |
| 2,699,457 | Ziegler et al. | Jan. 11, 1955 |
| 2,781,410 | Ziegler et al. | Feb. 12, 1957 |
| 2,884,409 | Bo et al. | Apr. 28, 1959 |

FOREIGN PATENTS

| | | |
|---|---|---|
| 785,314 | Great Britain | Oct. 23, 1957 |

OTHER REFERENCES

"Polyethylene," by Raff et al., Interscience Publishers Inc., New York, 1956, pages 66 and 67.